US012774700B2

(12) United States Patent
Giesler et al.

(10) Patent No.: US 12,774,700 B2
(45) Date of Patent: Oct. 27, 2026

(54) METHOD FOR SETTING A WIND POWER INSTALLATION

(71) Applicant: Wobben Properties GmbH, Aurich (DE)

(72) Inventors: Matthias Giesler, Aurich (DE); Philip Strauch, Aurich (DE); Frank Zimmermann, Emden (DE); Maik Nitsche, Schortens (DE); Harro Harms, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 331 days.

(21) Appl. No.: 18/451,518

(22) Filed: Aug. 17, 2023

(65) Prior Publication Data

US 2024/0060473 A1 Feb. 22, 2024

(30) Foreign Application Priority Data

Aug. 18, 2022 (DE) ........................ 102022120945.8

(51) Int. Cl.
*F03D 13/30* (2016.01)
*F03D 17/00* (2016.01)

(52) U.S. Cl.
CPC ........... *F03D 13/30* (2016.05); *F03D 17/017* (2023.08); *F03D 17/028* (2023.08);
(Continued)

(58) Field of Classification Search
CPC ...... F03D 13/30; F03D 17/017; F03D 17/028; F03D 7/0268; F03D 7/0298; F03D 7/043;
(Continued)

(56) References Cited

U.S. PATENT DOCUMENTS

2010/0301605 A1* 12/2010 Nielsen ................. F03D 7/0224 290/44
2011/0076142 A1 3/2011 Veldkamp et al.
(Continued)

FOREIGN PATENT DOCUMENTS

| | | | |
|---|---|---|---|
| DE | 10 2018 003 745 | A1 | 11/2019 |
| EP | 3859144 | A1 | 8/2021 |
| WO | 2021/023348 | A1 | 2/2021 |

*Primary Examiner* — Christopher W Carter
(74) *Attorney, Agent, or Firm* — Seed Intellectual Property Law Group LLP

(57) ABSTRACT

A method for setting a fully or partially built wind power installation having a rotor having a plurality of rotor blades whose blade angle can be adjusted, wherein the wind power installation can take on variable operating situations, and each operating situation is characterized by a combination of settable installation settings of the wind power installation and environmental conditions that can be captured, with the result that an operating situation can be set for given environmental conditions by setting the installation settings, and operating situations that should be avoided and/or suitable operating situations are stored in a memory by storing a combination of environmental conditions and installation settings as a combination to be avoided for an operating situation that should be avoided in each case, and/or storing a combination of environmental conditions and installation settings as a suitable combination for a suitable operating situation in each case, and, to avoid operating situations that should be avoided, environmental conditions are captured and, depending on the captured environmental conditions and the stored combinations to be avoided and/or suitable combinations, installation settings of the wind power installation are selected and set such that installation settings of stored combinations to be avoided are avoided, and/or installation settings are selected from stored suitable combinations.

19 Claims, 3 Drawing Sheets

(52) U.S. Cl.
CPC ....... *F05B 2260/31* (2020.08); *F05B 2260/80* (2013.01); *F05B 2270/32* (2013.01); *F05B 2270/321* (2013.01)

(58) Field of Classification Search
CPC .............. F05B 2260/31; F05B 2260/80; F05B 2270/32; F05B 2270/321; F05B 2260/84; F05B 2270/334
See application file for complete search history.

(56) References Cited

U.S. PATENT DOCUMENTS

| | | | | |
|---|---|---|---|---|
| 2011/0193344 | A1* | 8/2011 | Lafferty .................. | F03D 7/048<br>290/44 |
| 2011/0243706 | A1* | 10/2011 | Damgaard .............. | F03D 13/40<br>414/800 |
| 2014/0327243 | A1 | 11/2014 | Demtröder | |
| 2020/0173418 | A1* | 6/2020 | Arroyo Beltri ....... | F03D 7/0296 |

* cited by examiner

METHOD FOR SETTING A WIND POWER INSTALLATION

BACKGROUND

Technical Field

Embodiments of the present invention relate to a method for setting a wind power installation in order to avoid situations that should be avoided. Embodiments of the present invention also relate to a corresponding wind power installation.

Description of the Related Art

During ongoing operation, wind power installations are set such that they can feed as much power as possible into the electrical supply network. However, it should also be ensured that operating situations in which the wind power installation can be damaged are avoided. During ongoing operation, especially at high wind speeds, the wind power installations are curtailed such that they cannot be damaged thereby.

However, situations also come into consideration where not just a high wind speed or stressful operation leads to such stressful situations. Especially when the wind power installation is not in ongoing operation, even before it is connected to an electrical supply network, situations which jeopardize the wind power installation can occur.

In particular, situations may occur where the rotor blades or other elements of the wind power installation start to vibrate.

Although such vibrations can also be stimulated by high wind speeds, in particular, it often also comes down to other criteria. In any case, a certain wind speed does not always lead to vibrations.

Rather, such vibrations often only occur for certain positions of the rotor, blade angles of the rotor blades and other criteria. In addition, the wind is not only characterized by its wind speed, but rather its gustiness, wind direction and/or shear, to name just a few examples, can also influence such vibrations. Whether vibrations occur at all can depend on all these criteria. However, an amplitude of the vibrations may also depend on the criteria, in particular whether it becomes permissibly or impermissibly high.

In order to avoid damage to the wind power installation, provision may therefore be made for the wind power installation to be constantly monitored for operating situations which could damage the wind power installation. In particular, it is possible to constantly monitor whether vibrations with a hazardous amplitude occur. If such vibrations are detected, a setting of the wind power installation can be changed until the situation has improved, especially until detected vibrations have decreased or disappeared completely.

However, such a procedure is complex and requires constant monitoring and it must be stipulated which specific operating settings are to be changed in which way and in which detected operating situations in order to respond correctly to identified problems.

BRIEF SUMMARY

Embodiments of the present invention therefore address at least one of the above-mentioned problems. In particular, the embodiments may provide a solution for avoiding operating situations which jeopardize the wind power installation in the simplest possible way and/or as reliably as possible. The intention is at least to propose an alternative to previously known solutions.

A method for setting a fully or partially built wind power installation is proposed. The underlying wind power installation has a rotor having a plurality of blades whose blade angle can be adjusted. The wind power installation can take on variable operating situations, where each operating situation is characterized by a combination of settable installation settings of the wind power installation and environmental conditions that can be captured. An operating situation can therefore be set for given environmental conditions by setting the installation settings. It also comes into consideration that the wind power installation has not yet been fully built and/or has not yet been connected to an electrical supply network. In particular, it is proposed that the wind power installation has been built at least to the point where at least one of the plurality of rotor blades has been mounted.

The environmental conditions are assumed to be in particular wind speed and wind direction, with further properties such as turbulence being able to be added. It is assumed that these environmental conditions cannot be influenced.

However, the installation settings can be influenced. Such installation settings may be, in particular, a collective blade angle, individual blade angles, an azimuth orientation of the wind power installation, a rotor position of the rotor, and a speed of the rotor. It was recognized that only a combination of the given environmental conditions with the specific installation settings can lead to problems or, conversely, no problems occur with certain combinations. Any operating situation that is characterized by the environmental conditions and installation settings can thus be influenced by the choice of installation settings.

It is now also proposed to store operating situations that should be avoided and/or suitable operating situations in a memory. In order to carry out the method, operating situations that should be avoided and/or suitable operating situations are therefore stored in a memory. Further operating situations may be added later to increase the data stock.

An operating situation that should be avoided is therefore a situation in which the wind power installation can be jeopardized. A suitable operating situation is a situation in which the wind power installation is not expected to be jeopardized. A suitable operating situation may be a desired or preferred operating situation in this respect.

An operating situation is stored by storing a combination of environmental conditions and installation settings which specifically belong to the respective operating situation. The environmental conditions of an operating situation and thus of a combination can be referred to as an environmental condition set, that is to say, e.g., a set consisting of wind speed and a wind direction. The wind direction can be considered to be an absolute or relative wind direction. A relative wind direction denotes the wind direction in relation to an azimuth orientation, which can also be referred to as the nacelle orientation or orientation of the nacelle. The relative wind direction can therefore also be referred to synonymously as the azimuth error angle, and other environmental conditions can be taken into account. The installation settings for an operating situation and thus a combination can be referred to as an installation settings set, that is to say, e.g., a set consisting of azimuth orientation, rotor position and blade angle, and possibly further installation settings. An azimuth error angle can also be considered as or instead of the azimuth orientation. A combination of environmental conditions and installation settings is thus stored as a combination to be avoided for an operating situation that should be avoided, and a combination of environmental conditions and installation settings is stored as a suitable combination for a suitable operating situation. Thus, a combination of the environmental conditions set and the installation settings set is stored in each case.

Various combinations to be avoided and various suitable combinations can thus be stored. It is advantageous if both combinations to be avoided and suitable combinations are stored. However, it also comes into consideration that only one of these two categories is used and stored in each case.

To avoid operating situations that should be avoided, environmental conditions are first captured. In other words, a wind speed and a wind direction are captured, in particular. This can mean that current environmental conditions are captured, in particular measured. However, it also comes into consideration that environmental conditions, or some of them, are estimated by an observer or otherwise known, for example from weather forecasts.

It also comes into consideration that environmental conditions are predicted in order to set settings that are useful not only for the moment, but also for expected operating situations, or to avoid operating situations that should be avoided for a longer period of time.

Depending on the captured environmental conditions and the stored combinations to be avoided and/or suitable combinations, installation settings of the wind power installation, i.e., an installation settings set, are then selected and set. This is done in such a way that an installation settings set of stored combinations to be avoided is avoided in each case and/or an installation settings set is selected from stored suitable combinations.

Based on the captured environmental conditions, it is therefore possible to read from the memory which combinations should be avoided. Therefore, to give a simple example, if there is a certain wind direction and wind speed, it can be identified from the stored data which azimuth orientation, which blade angle and which rotor position, if the rotor is locked, should be avoided in order to avoid operating situations that should be avoided. The specific installation settings set should be avoided. Individual values can be used from it, but not the entire set. Installation settings are then selected, namely according to a specific installation settings set, which does not correspond to a combination to be avoided that is stored for these environmental conditions. This makes it possible to avoid the operating situation that should be avoided.

In addition or alternatively, however, it also comes into consideration that a combination that is expressly stored as suitable is selected, because this also leads to the fact that no operating situation that should be avoided is set.

It may be particularly preferred to apply the avoidance of combinations to be avoided and the targeted selection of a suitable combination together. For example, it is possible to proceed in such a way that a check as to whether a suitable combination has been stored is first of all carried out for captured environmental conditions. This can then be selected. If no suitable combination has been stored for captured environmental conditions, any combination can be selected, as long as it is not a combination to be avoided. If necessary, further restrictions must be taken into account, such as necessary rotor positions during construction or assembly or azimuth orientations to be avoided due to the positioning of a crane.

It is also possible to proceed in such a way that, based on the current installation settings and based on the captured environmental conditions, the stored suitable combination that is most similar to the current installation settings is selected, in which case, if necessary, it is checked whether such combinations can also be implemented. Especially when building the wind power installation, it can happen that not all settings can be implemented, for example because a crane used for the construction does not allow all nacelle positions and/or rotor positions, to give just one example.

In addition or alternatively, installation settings can be selected in such a way that they differ as much as possible from a stored combination to be avoided.

According to one aspect, it is proposed that the environmental conditions considered are the wind speed and wind direction, absolute or relative. Especially the wind speed and the wind direction were identified as particularly relevant environmental conditions for operating situations that should be avoided as well as suitable operating situations. The direction in which the wind attacks the nacelle of the wind power installation, relative to the orientation of the nacelle, i.e., at what angle in relation to a nacelle longitudinal axis, can be particularly relevant.

Optionally, it is proposed to consider a turbulence intensity as an environmental condition, since this can have a particular effect on vibrations.

It is proposed to consider an ambient temperature of the wind power installation as a further optional environmental condition. It has been identified that the ambient temperature is a property of the air and thus affects the effect of the wind on the wind power installation.

It is proposed to consider a vertical wind shear as a further possible optional environmental condition. A vertical wind shear denotes a change in the wind speed with the height. It has been recognized that such a wind shear can affect vibrations, since it results in the wind attacking in a lower region of the rotor of the wind power installation at a different wind speed than in a higher region of the rotor of the wind power installation.

It is proposed to consider a vertical wind direction shear as a further possible optional environmental condition. A vertical wind direction shear denotes a change in the wind direction with the height. It has been especially recognized that such a vertical wind direction shear can affect vibrations, since it results in the wind attacking in a lower region of the rotor of the wind power installation at a different angle than in a higher region of the rotor of the wind power installation.

It is also proposed to consider a vertical angle of inclination of the wind as an optional environmental condition. A vertical angle of inclination is an angle at which the wind flows relative to a horizontal plane, i.e., an angle at which the wind flows up or down. It can also be referred to as "flow inclination." It has been recognized that such a vertical angle of inclination can have a special effect on vibration excitations at rotor blades.

It is proposed to consider an air density as a further optional environmental condition. The air density affects the effect of the wind on the wind power installation and thus loads, including vibrations, that can be triggered.

According to one aspect, it is proposed that the installation settings considered are a collective blade angle, individual blade angles, an azimuth orientation of the wind power installation, and/or a rotor position of the rotor. It has been especially recognized that the blade angle, azimuth orientation, which can be used relative to the wind direction or in absolute terms, a rotor speed and a rotor position of the rotor can have a special effect on vibrations. In particular, there is a relationship between the azimuth orientation and wind direction, with the result that it is advantageous to consider the azimuth orientation as an installation setting, in particular in connection with the wind direction as an environmental condition considered.

The rotor position also influences the specific flow of the wind onto the rotor blades. The rotor position can be used to determine or derive whether or not a rotor blade is vertically up in a 12 o'clock position. The rotor position of the rotor also has a special effect due to the relative position of the rotor blades with respect to the tower of the wind power installation. It has been recognized that flow situations can be greatly affected by whether a rotor blade is directly in front of the tower, i.e., in a so-called 6 o'clock position, whether it is rotated somewhat further than the tower, or whether there is no rotor blade at all in the vicinity of the tower.

The blade angles also affect the angles at which the wind flows onto each rotor blade. Here, the angle of inflow can be understood as meaning an angle between the apparent wind direction and a chord of the rotor blade. By virtue of the respective blade angle, the direction of inflow, i.e., the angle of inflow, and thus the effect of the wind on the rotor blade can be changed to a large extent. This direction of inflow or the angle of inflow can have a large effect on vibrations that occur.

Such a blade angle can be specified by means of a collective blade angle, i.e., a blade angle that is set equally for all rotor blades. Especially with an azimuth orientation of the wind power installation into the wind, i.e., as with normal operation of the wind power installation, approximately the same requirements arise for the angles of attack of the wind on the rotor blades, with the result that the same or similar angles can also lead to the same or similar effects at the rotor blades. This can be taken into account by means of the collective blade angle.

Especially when the wind power installation is not oriented toward the wind, but rather is positioned transversely to it, for example, and then is not operated, the direction of inflow onto the rotor blades also depends quite considerably on the rotor position in which they are located. Here it may now be useful to set the blade angles individually in order to provide as little attack area as possible for the wind flowing sideways onto the wind power installation. However, this is only one example and it is not necessarily exclusively relevant how large an attack area a rotor blade offers to the wind, since the rotor blade has an aerodynamic profile.

A collective blade angle and individual blade angles can be specified together by virtue of the collective blade angle specifying a basic angle and the individual blade angles being able to be specified and set on the basis thereof.

A rotor position can be considered when the rotor is locked. If it is not locked, it is proposed to consider the rotor speed. It can then have a similar relevance, for combinations to be avoided or suitable combinations, to the rotor position in the locked case.

It is optionally provided to take into account whether the rotor is locked as an installation setting. Especially if the wind power installation is not operating to the extent that it does not generate any electrical power and feed it into the electrical supply network, the rotor may be locked in a predetermined rotor position or it may be allowed to rotate freely.

It has been recognized that an advantageous rotor position can be set by locking the rotor. Unfavorable rotor positions and rotor positions to be avoided can thus be avoided.

On the other hand, it has also been recognized that an unlocked rotor has the advantage that rotor blades can yield to forces caused by the wind. Whether the rotor is locked can therefore be an important installation setting and it is therefore proposed to take this into account. In particular, locking can be carried out for maintenance and assembly work, whereas a free, i.e., unlocked, rotor can be used without torque in other situations.

According to one aspect, it is proposed that the rotor blades of the wind power installation are adjusted, after the wind power installation has been built but before the wind power installation is connected to an electrical supply network, by means of an individual blade adjustment during which the blade angles of the rotor blades are adjusted individually and independently of one another, wherein, during feed-in operation, after the wind power installation has been connected to the electrical supply network, the rotor blades are set by specifying a collective blade angle, with the result that all rotor blades are set synchronously with one another and with the same blade angles. The energy for adjusting the rotor blades and possibly other elements can be obtained from a battery, an external power supply, e.g., a diesel generator, or from the wind power installation's own power generation.

It has been especially recognized here that operating situations that should be avoided can occur especially for wind power installations which, although already fully built, have not yet been connected to the electrical supply network and therefore also cannot yet be fully operated. The wind power installations can then be exposed to the wind conditions in a basically passive state. It also comes into consideration that the wind flows sideways onto them. It has been recognized that it may be advantageous to adjust the rotor blades individually from each other, especially in the case of such sideways inflow, and thus to also set individual blade angles.

At the same time, it has been recognized that it may be useful not to use this individual blade adjustment during operation of the wind power installation if it is connected to the electrical supply network and generates electrical power from wind in the completely normal way. Instead, it may be better to operate the wind power installation with uniform blade angles during ongoing feed-in operation. Not carrying out any individual blade adjustment during ongoing operation may be useful aerodynamically and/or in order to keep wear of blade adjustment devices to a minimum.

Therefore, this combination is proposed, in which an individual blade adjustment is only carried out before the wind power installation is connected to the electrical supply network. At the same time, it is proposed that a collective blade adjustment, i.e., without individual adjustment of the rotor blades, should only be provided for operation after the wind power installation has been connected to the electrical supply network and feeds power into it.

According to one aspect, it is proposed that, for the combinations to be avoided and/or suitable combinations, the installation settings and environmental conditions are respectively stored and/or taken into account as a range to be avoided or a suitable range. This allows the size of a necessary data set to be significantly reduced or kept small, since different values in a range can be combined. In particular, providing ranges with a width of at least 0.1 m/s, in particular at least or exactly 2 m/s, for wind speeds comes into consideration. For the wind direction, it is proposed to provide ranges with a width of at least 10, in particular at least 5°. For the rotor position, it is possible to provide a range width in the range of 1° to 50°, in particular in the range of 5° to 30°. A range width of 0.1° to 15°, in particular in the range of 1° to 5°, can be provided for the blade angles.

According to one aspect, it is proposed that the operating situations that should be avoided are those in which an oscillation of at least one component of the wind power installation, in particular at least one of the rotor blades, with a dangerous amplitude is to be expected, in particular with an amplitude which reaches or exceeds a predefinable amplitude limit. It also comes into consideration that the amplitude of a vibration of the tower of the wind power installation is considered to be an operating situation that should be avoided. Especially such operating situations have been identified as critical and it is proposed to take them into account in particular. It has also been recognized here that oscillations can occur and cannot necessarily be avoided if their amplitude is only sufficiently low. However, they must be taken into account in the event of a high amplitude, that is to say a dangerous amplitude. A predetermined amplitude limit can be specified for consideration. This can be determined in simulations.

It is proposed, in particular, to take into account oscillations of rotor blades or at least one rotor blade. It has been especially recognized here that the rotor blades are particularly susceptible to vibrations, since they are correspondingly large and exposed to the wind. However, it also comes into consideration that oscillations of the tower of the wind power installation can occur and reach a dangerous amplitude.

A dangerous amplitude is an amplitude that can potentially damage the wind power installation. An oscillation with an excessively high amplitude need not necessarily immediately lead to damage such as the breakage of a rotor blade, but it can lead to such a high load that damage can be expected soon.

In addition or alternatively, it is proposed that, when an oscillation of the component, that is to say in particular at least one of the rotor blades, is detected for a current operating situation, in particular with an amplitude which reaches or exceeds the predefinable amplitude limit, the current operating situation is stored as an operating situation that should be avoided. For this purpose, the combination of installation settings and environmental conditions, i.e., the combination of the installation settings set and environmental conditions set, of the current operating situation is stored as a combination to be avoided.

In this way, a corresponding database, in particular, can be built up gradually. It should be noted that, in order to detect such an operating situation with a high, specifically potentially dangerous, amplitude, it is not necessary for the wind power installation to be operated permanently in such an operating situation. In fact, oscillations can occur even when activating an operating situation. The wind power installation thus goes through such an operating situation, while the oscillations occur briefly, but disappear immediately again, since the operating situation is not maintained. This brief occurrence allows the oscillations to be captured and stored without actually jeopardizing the wind power installation.

For example, to clearly explain this in a simple example, the azimuth position of a wind power installation can be continuously adjusted, passing through a range in which oscillations with a high amplitude occur. While the wind power installation continues to adjust the azimuth position as planned, the operating situation that has been achieved in the meantime can be stored, however, as an operating situation that should be avoided.

Such identification as an operating situation that should be avoided, including subsequent storage as an operating situation that should be avoided, may be carried out by a process control unit independently, i.e., fully automatically. However, it also comes into consideration, for example, that a service team makes observations of an operating situation or that a measurement team conducts measurements specifically for this situation, which should be classified as an operating situation that should be avoided, and then stores the observed operating situation, which is namely current at that moment, as an operating situation that should be avoided.

According to one aspect, it is proposed that, when no oscillation of the component of the wind power installation, in particular at least one of the rotor blades, is detected for a current operating situation, at least only with an amplitude below a predefinable amplitude threshold, the current operating situation is stored as a suitable operating situation. This can be done by storing a combination of installation settings and environmental conditions of the current operating situation as a suitable combination. The combination of the installation settings set and environmental conditions set of the current operating situation is thus stored as a suitable combination.

The amplitude threshold is specified in particular with a comparatively low value which is below the predefinable amplitude limit, from which a dangerous amplitude is assumed.

As an alternative or in addition to checking for a vibration or oscillation, checking for an absolute load, especially for absolute bending or deformation, also comes into consideration. In any case, i.e., both in the case of oscillations and in the case of absolute loads, detection can be carried out via an acceleration and/or by means of strain sensors such as strain gages. If necessary, the acceleration can be converted into an oscillation and/or a limit value converted to the acceleration can be used.

It is therefore proposed to monitor whether or not a current operating situation is potentially damaging or potentially dangerous. This checks for oscillations. If these do not occur in a current operating situation, this is stored as a suitable operating situation. The same applies if only minor oscillations occur, which can be classified as harmless.

Storage is effected by storing a combination of installation settings and environmental conditions of the current operating situation as a suitable combination. In this way, a data set can also be expanded during ongoing operation, including in a situation in which the wind power installation has not yet been connected to the electrical supply network.

It is optionally proposed that a stored suitable operating situation is checked further and stored as a confirmed suitable operating situation if this stored suitable operating situation has occurred repeatedly and no oscillations of the components or rotor blades have occurred, at least only with an amplitude below the predefinable amplitude threshold. It is therefore proposed that a verification should be carried out for suitable operating situations. Once an operating situation has occurred and has been identified as a suitable operating situation, it can already be used as a suitable operating situation. However, it may be used as a suitable operating situation only after it has been confirmed.

In particular, it is proposed that operating situations are set by capturing current environmental conditions and setting installation settings of the wind power installation such that a stored confirmed suitable operating situation is set. Therefore, the selection and setting of installation settings on the basis of captured environmental conditions is only carried out according to a suitable operating situation when the suitable operating situation has been confirmed.

According to one aspect, it is proposed that the method is carried out in a non-feeding-in state of the wind power installation when the wind power installation does not generate any power and/or does not feed any power into an electrical supply network, in particular in a commissioning period in which the wind power installation has already been completed, but has not yet been connected to the electrical supply network and therefore no electrical power can be fed into the electrical supply network, in particular in a period of up to 6 months, in particular up to 3 months, after completion. Completion can also be referred to as building or complete building of the wind power installation.

It has been especially recognized here that the wind power installation is exposed to different environmental conditions, especially wind conditions, at a standstill before being connected to the electrical supply network. Especially in such a situation, problematic operating situations can occur, in particular vibrations that do not occur during normal operation of the wind power installation. In particular, sideways inflows can occur here and/or inflows to stationary rotor blades can occur, which can lead to problematic operating situations. Therefore, the proposed method is proposed especially for the commissioning period.

In addition or alternatively, the method is carried out in a conversion situation when the wind power installation is locked, especially when at least the rotor is locked. It has been recognized here that such conversion situations are planned for a relatively long period of time, often for several days. The wind power installation cannot be operated during that time. Even some actuators for changing the installation settings are then inactive. In this situation, an installation setting for which no excessively strong oscillations occur should be selected if possible.

According to one aspect, it is proposed that at least some of the stored operating situations that should be avoided and/or the stored suitable operating situations have been received from at least one structurally identical or similar wind power installation.

The underlying idea here is that the operating situations that should be avoided and/or suitable operating situations can be identified particularly well from operating situations that have actually occurred. Especially if the method is planned for the commissioning phase, there is little time left to record operating situations that should be avoided and/or suitable operating situations. It is therefore proposed to take such operating situations from at least one other structurally identical wind power installation, in particular to collect such operating situations from as many structurally identical wind power installations as possible. This means that, despite a short commissioning phase, a database with many different operating situations can be created.

When a new wind power installation is built, it can already resort to many stored operating situations that should be avoided and/or suitable operating situations.

In principle, the installation behavior of wind power installations also differs depending on the location used. However, it has been recognized that the transferability of such operating situations from one structurally identical wind power installation to another installed at a different installation location can still be good. This is possible, in particular, by recording various environmental conditions, thus making it possible to take location differences into account.

According to one aspect, it is proposed that a warning signal is output if an operating situation that should be avoided is set, or if an operating situation that should be avoided is caused by changing environmental conditions, or is expected to occur.

Such a warning signal can also be transmitted via a data transmission to a control center or other point used for monitoring. In particular, a transmission in a SCADA system comes into consideration here. This can also prevent a corresponding unfavorable operating situation. The warning signal makes it possible for service personnel to identify the problem and find an individual solution. In particular, it is possible to detect in a fully automatic manner here that an operating situation that should be avoided is intended to be set, but a more suitable operating situation, i.e., suitable installation settings, can be found individually by service personnel.

According to one aspect, it is proposed that capturing and storing of operating situations that should be avoided and/or capturing and storing of suitable, in particular confirmed suitable, operating situations are continuously repeated in changing environmental conditions in order to thereby establish a data pool with operating situations that should be avoided and/or suitable, in particular confirmed suitable, operating situations.

This allows such a data pool to be established during ongoing operation. The data situation for operating situations that should be avoided and/or suitable operating situations can thus be continuously improved. In particular, such a continuous improvement in the data situation can be achieved by allowing a wind power installation to respectively build on an existing data pool which has already been created by structurally identical or similar wind power installations. Structurally identical or similar wind power installations are in particular, not only for this aspect, but quite generally, those in which the mechanical structure, especially rotor blades and nacelles, are mechanically identical, i.e., have the same design and the same material. The data pool can be expanded and finally transferred to the next wind power installation in a commissioning phase. This wind power installation can then in turn also supplement the data pool. A data pool could also be centrally managed and/or stored, e.g., on a central server.

According to one aspect, it is proposed that operating situations that should be avoided and/or suitable, in particular confirmed suitable, operating situations are captured by means of simulations and then stored. It is proposed that operating situations that should be avoided and/or suitable, in particular confirmed suitable, operating situations are also captured by means of measurements and stored. The simulations can be used to check some operating situations and thus create a first data set. This already makes it possible to avoid operating situations that should be avoided. It is also possible, in particular, to model operating situations that can be simulated well and reliably, in order to find some suitable operating situations. This means that protected operation can already be achieved.

In order to improve the data situation, measurements can be additionally carried out, thus enabling better identification of operating situations that should be avoided and/or suitable operating situations. It has been especially recognized here that a simulation cannot be performed with arbitrary accuracy and the consideration of any number of environmental conditions and/or installation settings. Capacity limits for such simulations may occur here and/or simulations may become inaccurate. It also comes into consideration that it is difficult or not possible to consider all the many environmental conditions and installation settings at the same time in a simulation. Combining simulations and measurements makes it possible to combine the advantages of the two methods. In particular, the advantage of the simulation of determining operating situations in advance can be combined with the advantage of the measurements of being able to assess or record operating situations in a particularly accurate manner.

According to one aspect, it is proposed that critical operating situations are captured and that an operating situation that should be avoided is inferred from a captured critical operating situation. Critical operating situations are those in which an oscillation of the component of the wind power installation, in particular at least one of the rotor blades, occurs with an amplitude which is above the predefinable amplitude threshold, but below the amplitude limit which is greater than the amplitude threshold in this respect. The amplitude is therefore already high, but not yet so high as to be classified as dangerous. However, it is also already so high that it can no longer be regarded as uncritical.

As an alternative or in addition to checking for a vibration or oscillation, checking for an absolute load, especially for absolute bending or deformation, also comes into consideration for the critical operating situations. Here too, in any case, capture can be effected via an acceleration and/or by means of strain sensors such as strain gages. The acceleration can be converted into an oscillation and/or a limit value converted to the acceleration can be used.

Such a critical operating situation therefore indicates that an operating situation that should be avoided may be nearby. An operating situation that should be avoided could therefore occur with a small change in at least one of the installation settings.

An operating situation that should be avoided can therefore be inferred on the basis of this.

In particular, this can be done in such a way that at least one installation setting is changed, and an operating situation that should be avoided is inferred from a resulting increase or decrease in the amplitude of the oscillation, in particular without setting it.

If, for example, there is a situation in which a high oscillation has occurred on a rotor blade, it is possible to test whether the oscillation increases or decreases by adjusting an installation setting. If it increases, for example if the blade angle of the rotor blade in question, on which the oscillation occurs, is increased further, it can be concluded that the amplitude limit will be reached if there is a further increase. However, this further increase is not carried out, but rather it is only assumed that an operating situation that should be avoided will occur in the event of this further increase and is therefore only anticipated. This anticipated operating situation can then be stored as an operating situation that should be avoided. An operating situation that should be avoided is then stored without it ever having been actually set or tested in a simulation.

It has been especially recognized here that many installation settings are possible during commissioning, that is to say when the wind power installation is not yet generating or feeding in any power. It is therefore acceptable to store an operating situation as an operating situation that should be avoided, even though it was only expected that this operating situation would be an operating situation that should be avoided. A check could result in the anticipated operating situation actually not being an operating situation that should be avoided. It would then be incorrectly stored as an operating situation that should be avoided. However, since there are many setting options for the installation settings, it is better to also store such an operating situation as an operating situation that should be avoided as a precaution and to take it into account accordingly, i.e., to avoid it.

A fully or partially built wind power installation is also proposed. The wind power installation has a rotor having a plurality of blades whose blade angle can be adjusted, wherein the wind power installation is prepared to carry out a method for setting the wind power installation. In particular, it is proposed that the wind power installation has been built at least to the point where at least one of the plurality of rotor blades has been mounted.

The wind power installation can take on variable operating situations, and each operating situation is characterized by a combination of settable installation settings of the wind power installation and environmental conditions that can be captured, so that an operating situation can be set for given environmental conditions by setting the installation settings. Operating situations that should be avoided and/or suitable operating situations are stored in a memory by storing a combination of environmental conditions and installation settings as a combination to be avoided for an operating situation that should be avoided in each case, and/or storing a combination of environmental conditions and installation settings as a suitable combination for a suitable operating situation in each case. To avoid operating situations that should be avoided, the method is used to capture environmental conditions. Depending on the captured environmental conditions and the stored combinations to be avoided and/or suitable combinations, installation settings of the wind power installation are selected and set such that installation settings of stored combinations to be avoided are avoided, and/or installation settings are selected from stored suitable combinations.

In particular, the wind power installation has an installation controller and is prepared to carry out a method according to one of the embodiments described above. In particular, the installation controller can be prepared for this purpose.

The wind power installation or its installation controller may be prepared to carry out the proposed method by virtue of the fact that this method is implemented on a process computer that is part of the wind power installation, in particular part of the installation controller. It also comes into consideration that the process computer contains the installation controller.

In addition, the wind power installation or its installation controller has interfaces or connections to capture devices, in particular measuring sensors. In addition or alternatively, there may be communication with providers of weather forecasts and/or communication with a park controller and/or a control center.

BRIEF DESCRIPTION OF THE SEVERAL VIEWS OF THE DRAWINGS

Embodiments of the invention are explained in more detail below by way of example with reference to the accompanying figures.

DETAILED DESCRIPTION

Figure 1:
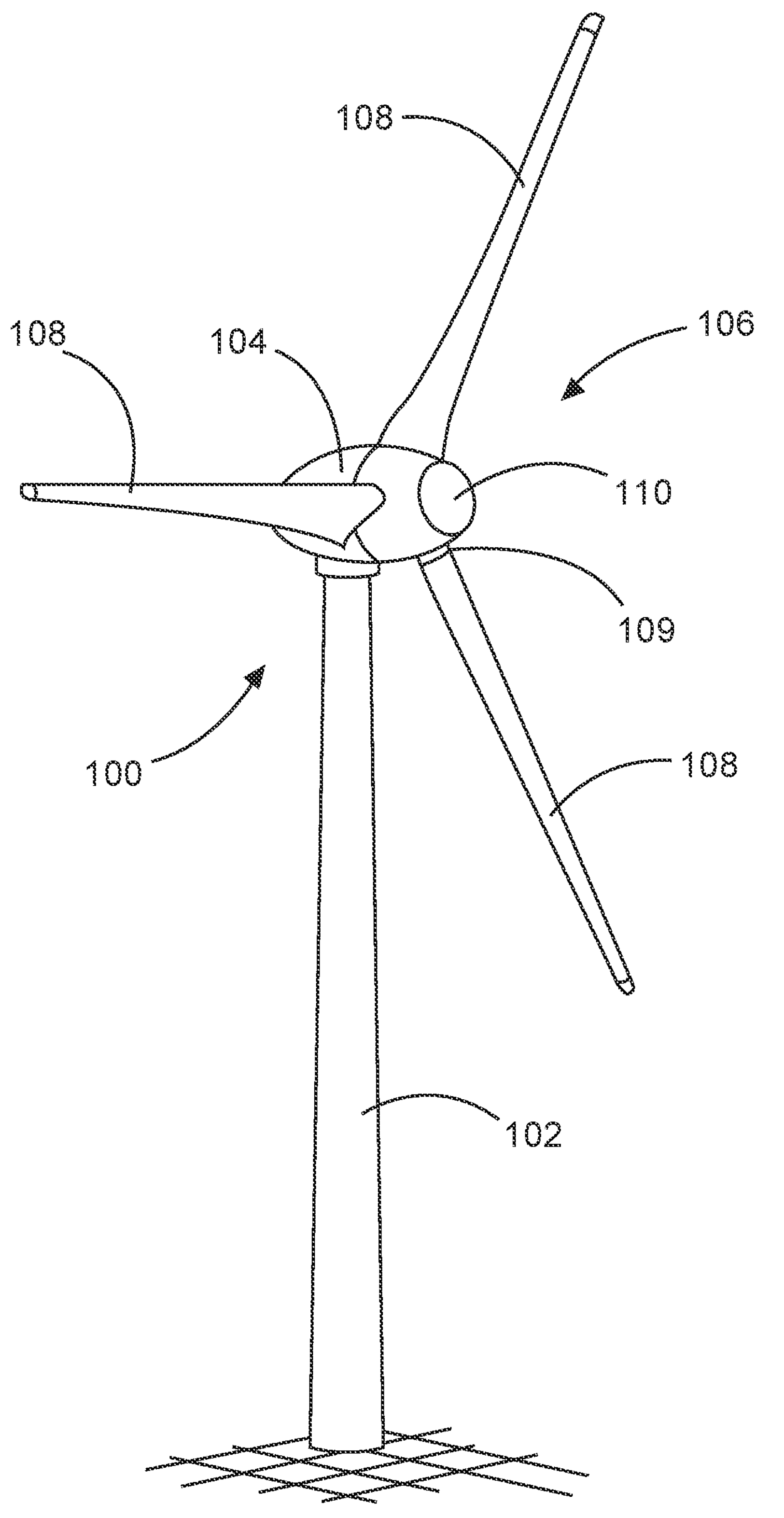
FIG. 1 shows a perspective illustration of a wind power installation.

FIG. 1 shows a wind power installation 100 with a tower 102 and a nacelle 104. A rotor 106 having three rotor blades 108 and having a spinner 110 is disposed on the nacelle 104.

During operation, the rotor 106 is set in rotational motion by the wind and in this way drives a generator in the nacelle 104.

Figure 2:
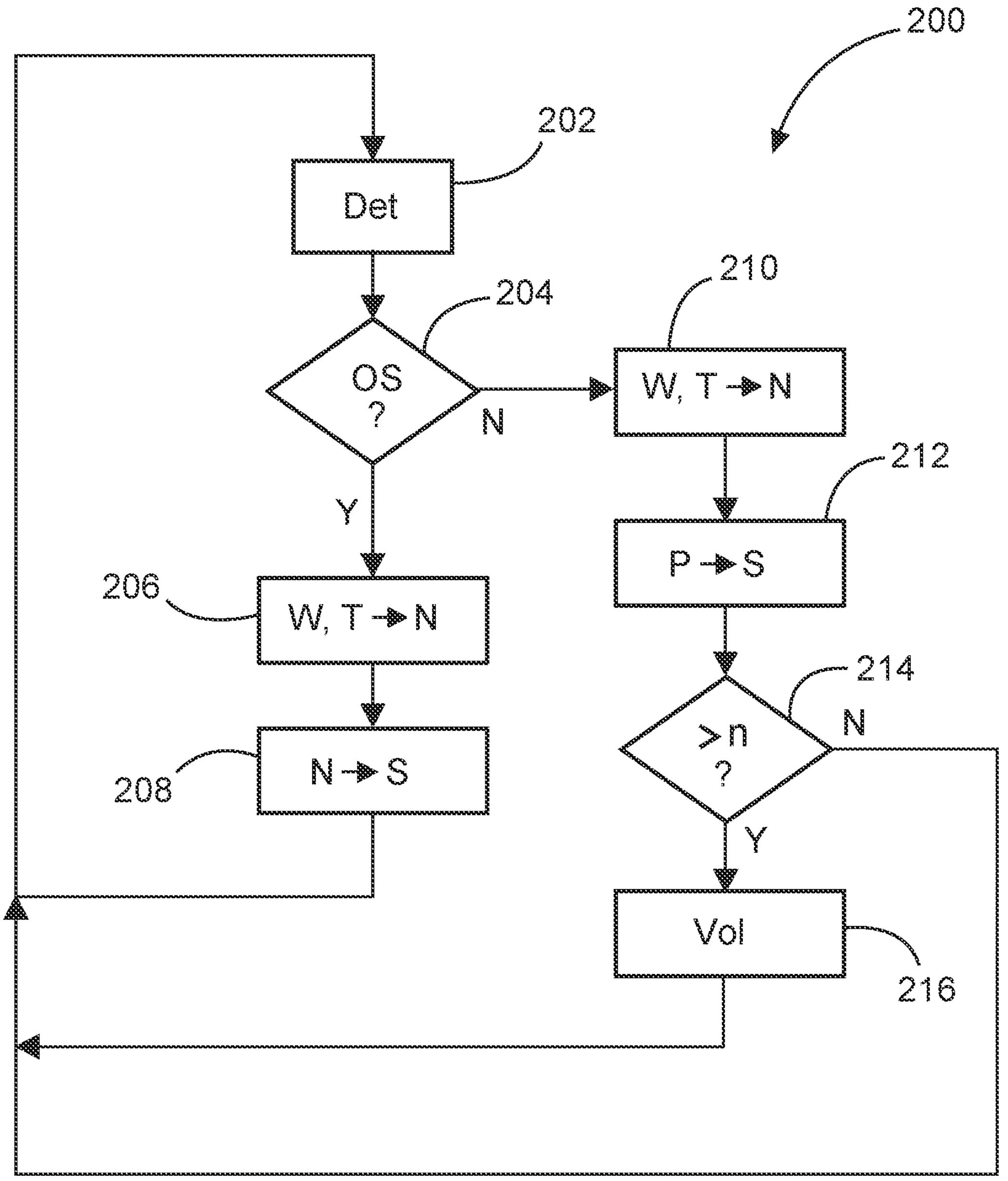
FIG. 2 shows a flowchart for classifying and storing operating situations.

FIG. 2 shows a flowchart 200 for storing operating situations that should be avoided and suitable operating situations. In the detection step 202, properties of the wind power installation are captured, in particular vibrations of the rotor blades. The data captured in this way, in particular vibration amplitudes, are transferred to the assessment step 204. In the assessment step 204, it is assessed whether there is a situation that jeopardizes the wind power installation, in particular whether at least one of the captured oscillations has a dangerous amplitude, in particular an amplitude that reaches or exceeds a limit amplitude.

If such a dangerous situation, in particular dangerous amplitude of the oscillation, was detected in the assessment step 204, the process branches to the negative result step 206. In the negative result step 206, the environmental conditions and the installation settings of the current operating situation are combined as a negative combination and therefore a combination to be avoided.

In the following negative storage step 208, this combination to be avoided is stored and also marked as a combination to be avoided. This marking can be done simply by storing the negative combination in a corresponding sub-memory, in which only negative combinations, i.e., combinations to be avoided, are stored.

The method then returns to the detection step 202 and the sequence starts over. In particular, new capture and detection take place as soon as at least one operating situation has changed and/or as soon as a minimum repetition time has elapsed, which may be in the range of at least 5 minutes.

If it is determined in the assessment step 204 that no dangerous amplitudes are present or no other dangerous situations have been detected, the sequence branches to the positive result step 210. In the positive result step 210, the environmental conditions and installation settings of the current operating situation are combined as a positive combination.

In the subsequent positive storage step 212, this positive combination is stored as a suitable combination and marked as a suitable combination. The marking as a suitable combination can also be effected here by using a corresponding sub-memory which does not correspond to a sub-memory which was used in the negative storage step 208 for the combination to be avoided.

However, other variants also come into consideration, both for the negative storage step 208 and for the positive storage step 212, in which an attribute is also stored, to name just one more example.

The positive storage step 212 is followed by a verification step 214. In the verification step 214, it is checked whether the positive combination has already occurred more often than a predetermined number of occurrences n. The number of occurrences can also assume the value 1, and may be selected in the range from 2 to 5.

If the current combination has occurred more frequently than the number of occurrences n, the verification step 214 branches to the validation step 216. In the validation step 216, the suitable combination of the current operating situation is marked as a confirmed suitable combination. This can also be done by means of an attribute that is also stored for the combination.

If this combination has therefore already occurred several times, namely as a suitable combination, this also means that it has already been stored. In this case, provision may be made in the positive storage step 212 to only determine that the combination has already been stored, and to increase a counter stored with the combination by a value. This counter increased in this manner can be checked in the verification step 214 in order to determine whether the number of occurrences n has been exceeded.

After the validation step 216, the routine also returns to the detection step 202.

If it has been determined in the verification step 214 that the number of occurrences n has not yet been exceeded, nothing else happens and the combination of the current operating situation remains stored as a suitable combination and its attribute is not changed to a confirmed suitable combination, but remains an unconfirmed suitable combination. The flowchart then only returns directly from the verification step 214 to the detection step 202.

The routine described for storing in the flowchart 200 divides operating situations into operating situations that should be avoided, suitable operating situations and confirmed suitable operating situations and stores them accordingly. For this purpose, a combination to be avoided, a suitable combination or a confirmed suitable combination is respectively stored accordingly or marked as such.

In the unlikely event that a dangerous amplitude or other dangerous situation was detected in the assessment step 204 and the associated combination was already stored as a suitable combination, this is overwritten as a combination to be avoided.

In the unlikely event that no dangerous amplitude or other dangerous situation was detected in the assessment step 204, but a combination to be avoided has already been stored for the associated combination, this combination to be avoided is left in the memory as a combination to be avoided. Provision may now be made to output a corresponding notice so that a check can be performed. First of all, however, the combination to be avoided is retained in the memory as such.

Figure 3:
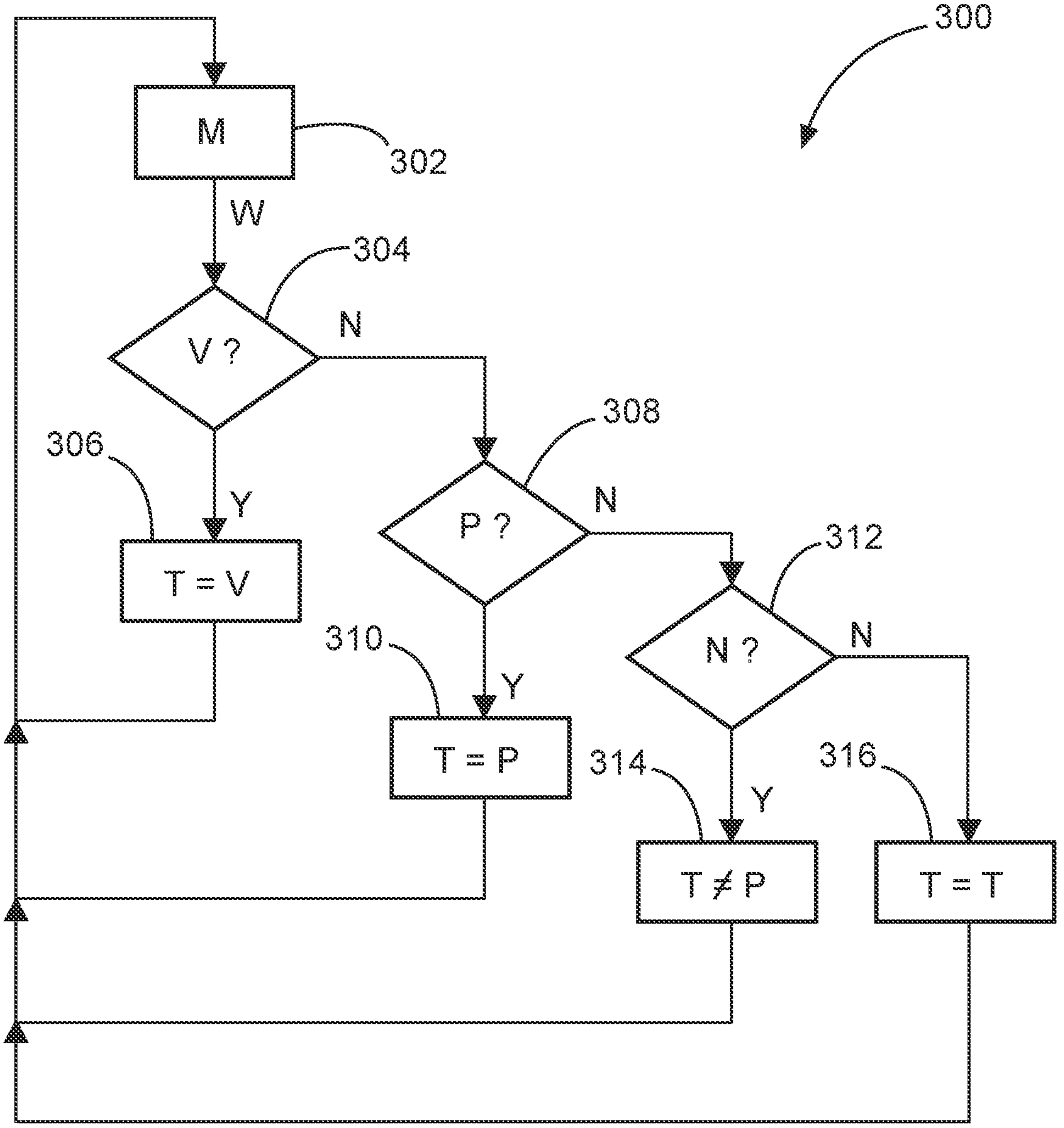
FIG. 3 shows a flowchart for selecting a combination of stored environmental conditions and installation settings.

FIG. 3 shows a flowchart 300 for explaining the selection and setting of installation settings depending on captured environmental conditions and stored combinations to be avoided and suitable combinations.

In the capture step 302, current or future environmental conditions for which installation settings must be made are captured, in particular measured.

With these environmental conditions W, the flowchart 300 passes to the verification query step 304. In the verification query step 304, it is checked whether a confirmed suitable combination has been stored for the captured environmental conditions. If so, the verification query step 304 branches to the confirmed assignment step 306.

If a plurality of confirmed suitable combinations have been identified in the verification query step 304 for the captured environmental conditions W, i.e., a plurality of confirmed suitable combinations have been stored, a choice can be made between them using a further selection criterion, which is not shown in the flowchart 300. The number of times the respective combination was identified as a suitable combination can be used as a criterion. For this purpose, the combination may have also stored a corresponding counter. This can be incremented, as explained in FIG. 2 in connection with the positive storage step 212.

It also comes into consideration that preferred basic settings are stored and, of the combinations found in the memory, that combination in which the installation settings are closest to the basic settings is selected. It also comes into consideration that a combination in which the installation settings are most similar to the current installation settings is selected. Again, these are just other examples of possible selection criteria.

In the confirmed assignment step 306, the installation settings T are set to the installation settings V according to the stored confirmed suitable combination. The routine according to the flowchart 300 has thus been accomplished, but the process can be repeated when environmental conditions change, with the result that the routine returns to the capture step 302 and the routine is repeated with capture of the environmental conditions.

If no confirmed suitable combination for the captured environmental conditions W was identified in the verification query step 304, a further query is carried out in accordance with the positive query step 308.

In the positive query step 308, it is then checked whether a suitable combination has been stored for the captured environmental conditions W. If so, the positive query step 308 branches to the positive assignment step 310. In the positive assignment step 310, the installation settings T are set to the settings P of the stored suitable combination that has been found. A further selection criterion can also be taken into account here, as explained with respect to the verification query step 304, if a plurality of suitable combinations have been found in the positive query step.

The positive query step 308 therefore checks for suitable combinations that do not have to be verified, i.e., confirmed. Since the positive query step 308 is only carried out if the verification query step 304 has not found any confirmed suitable combinations, the positive query step 308 should also not find any confirmed suitable combinations, but only unconfirmed suitable combinations. Such a combination is accordingly used in the positive assignment step 310.

Here too, the routine returns to the capture step 302 after the positive assignment step 310.

If no suitable combination was found in the positive query step 308 either, the routine passes to the negative query step 312. In the negative query step 312, it is checked whether a combination to be avoided has been stored for the captured environmental conditions W. If so, in the negative assignment step 314, installation settings are selected that do not correspond to any combination to be avoided that has been stored for the captured environmental conditions.

Thus, in the negative query step 312, it is necessary to check for all combinations to be avoided that have been stored for the captured environmental conditions so that the installation settings T do not correspond to a set of installation settings of the stored combinations to be avoided.

The installation settings are then selected from the remaining options, which have therefore hitherto not yet been checked. Criteria which have also been explained above in connection with both the verification query step 304 and the positive query step 308 can be used here for the specific selection. In addition, the selection can be made here in such a way that installation settings deviate as much as possible from the stored combinations to be avoided or deviate from the respective sets of installation settings contained there.

After the negative assignment step 314, the routine returns to the capture step 302.

If no combination to be avoided was found in the negative query step 312, this initially means that no combinations were stored for the captured environmental conditions. The routine then branches to the normal assignment step 316. Basically, any selection of the installation settings T can be made there. In the simplest case, the installation settings T simply remain unchanged.

Finally, the routine returns to the capture step 302 even after the normal assignment step 316.

Embodiments of the invention are therefore based on the following considerations and the following suggestions are made and further explanations are given.

The following is proposed: Critical states that occur in the field on wind power installations are combined in a matrix of no-go situations. Critical states or no-go situations are therefore operating states that should be avoided. Likewise, non-critical situations could also be (additionally or alternatively) combined in a matrix of safe states. Safe states are therefore suitable operating states. The wind power installations and/or service/construction teams or other interested persons or units are guided by these matrices. This prevents the wind power installations from getting into no-go situations. Each matrix represents a memory in which the situations or associated data are stored, in particular in a table, which is to be highlighted by the term matrix.

Example 1

The rotor blades of a wind power installation start to swing in a situation with the rotor locked.

The wind power installation detects this behavior as dangerous and reports captured boundary conditions such as pitch angle of the rotor blades, rotor azimuth position, nacelle misalignment with respect to the wind, wind speed, where a nacelle misalignment denotes an angular deviation between the nacelle azimuth orientation and the wind speed.

This information is combined in a matrix of no-go situations.

If the same or a different wind power installation (of the same type) is locked, care is taken to avoid these and other no-go situations that have already been stored.

For example, the wind power installation could prevent the locking of the rotor for certain wind directions, pitch angles, rotor azimuth positions, or at least indicate the danger of this situation.

In addition or alternatively, it comes into consideration that service/construction teams are informed of these no-go situations and will be guided by them.

Example 2

The rotor is locked on a wind power installation for several days.

During this time, the wind power installation will monitor itself for critical situations, but no dangerous behavior will be detected.

The captured boundary conditions, e.g., pitch angle of the rotor blades, rotor azimuth position, nacelle misalignment with respect to the wind, wind speed, are reported as a potentially safe state.

If these boundary conditions are reported several times as a potentially safe state, it is assumed that these boundary conditions are actually safe for the wind power installation and stored accordingly in the matrix of safe states. Safe states thus correspond to confirmed suitable operating states, i.e., suitable operating states that have been verified.

If a wind power installation of this type is subsequently locked for several days due to conversion measures, and the forecast wind conditions and other boundary conditions on the construction site permit it, one of the states from the matrix of safe states is specifically started.

Example 3

A large number of tests on, for example, prototype wind power installations determine which states can be critical for the wind power installations and which states should more likely be classified as a safe state.

The critical states are combined in the "no-go matrix," and the safe states are combined in the "matrix of safe states."

An embodiment is provided, in particular, for situations in which one or more rotor blades may swing to an impermissible extent in idling or rotor-locked situations.

In general, some embodiments offer the possibility of continuously improving the assumptions made primarily by means of simulations or by other means about "no-go areas" and "situations of safe states" by means of measurements on real installations.

Some embodiments can also be used for, e.g., tower vibrations that could occur, for example, during the construction of the wind power installation.

The following example is used for further explanation: Assume that, for a certain tower, it was determined in advance for a certain construction state that this construction state is only permissible up to 12 m/s, since it was assumed that impermissibly strong tower vibrations could occur at wind speeds >12 m/s.

Now it is discovered on the construction site that the tower already swings to an impermissible extent at 10 m/s.

This finding is stored in a corresponding no-go matrix and is therefore available for future tower installations.

Some embodiments allow that damage to wind power installations can be avoided.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for setting a fully or partially built wind power installation having a rotor having a plurality of rotor blades whose blade angle can be adjusted, wherein the wind power installation can take on variable operating situations, and each operating situation is characterized by a combination of settable installation settings of the wind power installation and environmental conditions that can be captured, so that an operating situation can be set for given environmental conditions by setting the installation settings, wherein the method comprises:

storing operating situations to be avoided and suitable operating situations in a memory by:

for each of a plurality of combinations of environmental conditions and installation settings for operating situations that should be avoided, storing a combination of environmental conditions and installation settings as a combination to be avoided for an operating situation that should be avoided, and for each of a plurality of combinations of environmental conditions and installation settings for operating situations that are suitable, storing a combination of environmental conditions and installation settings as a suitable combination for a suitable operating situation; and avoiding operating situations that should be avoided by:

capturing environmental conditions; and depending on the captured environmental conditions and the stored combinations to be avoided and suitable combinations, selecting and setting installation settings of the wind power installation such that:

installation settings of stored combinations to be avoided are avoided, and installation settings are selected from stored suitable combinations, wherein the installation settings considered include an azimuth orientation of the wind power installation, wherein the avoiding operating situations that should be avoided includes adjusting the azimuth orientation of the wind power installation, wherein the wind power installation is in a parked situation, and wherein the parked situation is an idling or rotor-locked situation.

2. The method as claimed in claim 1, wherein the environmental conditions considered include wind speed and wind direction.

3. The method as claimed in claim 2, wherein the environmental conditions considered include turbulence intensity, ambient temperature of the wind power installation, vertical wind shear, vertical wind direction shear, vertical angle of inclination of the wind, and air density.

4. The method as claimed in claim 1, wherein the installation settings considered further include:

a collective blade angle, individual blade angles, a rotor speed, or a rotor position of the rotor.

5. The method as claimed in claim 4, wherein the installation settings considered include whether the rotor is locked.

6. The method as claimed in claim 1, wherein:

the rotor blades of the wind power installation are adjusted, after the wind power installation has been built but before the wind power installation is connected to an electrical supply network, by an individual blade adjustment during which the blade angles of the rotor blades are adjusted individually and independently of one other, and during feed-in operation, after the wind power installation has been connected to the electrical supply network, the rotor blades are set by specifying a collective blade angle, with a result that all rotor blades are set synchronously with one another and with the same blade angles.

7. The method as claimed in claim 1, wherein:

for the combinations to be avoided and suitable combinations, the installation settings and environmental conditions are respectively stored or taken into account as a range to be avoided or a suitable range.

8. The method as claimed in claim 1, wherein:

the operating situations that should be avoided are those in which an oscillation of at least one component of the wind power installation with a dangerous amplitude is to be expected, or if an oscillation of the at least one component is detected for a current operating situation, the current operating situation is stored as an operating situation that should be avoided by storing a combination of installation settings and environmental conditions of the current operating situation as a combination to be avoided.

9. The method as claimed in claim 8, wherein:

the operating situations that should be avoided are those in which an oscillation of at least one of the rotor blades reaches or exceeds a predetermined amplitude limit, or if an oscillation of at least one of the rotor blades is detected for a current operating situation with an amplitude which reaches or exceeds the predetermined amplitude limit, the current operating situation is stored as an operating situation that should be avoided by storing a combination of installation settings and environmental conditions of the current operating situation as a combination to be avoided.

10. The method as claimed in claim 1, wherein:

if no oscillation of a component of the wind power installation is detected for a current operating situation, at least only with an amplitude below a predetermined amplitude threshold, the current operating situation is stored as a suitable operating situation by storing a combination of installation settings and environmental conditions of the current operating situation as a suitable combination.

11. The method as claimed in claim 1, wherein:

if no oscillation of at least one of the rotor blades is detected for a current operating situation, at least only with an amplitude below a predetermined amplitude threshold, the current operating situation is stored as a suitable operating situation by storing a combination of installation settings and environmental conditions of the current operating situation as a suitable combination; and a stored suitable operating situation is stored as a confirmed suitable operating situation if this stored suitable operating situation has occurred repeatedly and no oscillation of a component of the wind power installation or the rotor blades has occurred, at least only with an amplitude below the predetermined amplitude threshold, wherein operating situations are set by capturing environmental conditions and setting installation settings of the wind power installation such that a stored confirmed suitable operating situation is set.

12. The method as claimed in claim 1, wherein:

the method is carried out in a non-feeding-in state of the wind power installation when the wind power installation does not generate any power or does not feed any power into an electrical supply network, in a commissioning period in which the wind power installation has already been completed, but has not yet been connected to the electrical supply network and therefore no electrical power can be fed into the electrical supply network, in a period of up to 3 or 6 months after completion, or in a conversion situation when the wind power installation is locked, when at least the rotor is locked.

13. The method as claimed in claim 1, wherein:

at least some of the stored operating situations that should be avoided or suitable operating situations have been received from at least one structurally identical wind power installation.

14. The method as claimed in claim 1, wherein:

a warning signal is output if an operating situation that should be avoided is set, or if an operating situation that should be avoided is caused by changing environmental conditions, or is expected to occur.

15. The method as claimed in claim 1, wherein:

capturing and storing of operating situations that should be avoided or capturing and storing of suitable, or confirmed suitable, operating situations are continuously repeated in changing environmental conditions in order to thereby establish a data pool with operating situations that should be avoided or suitable, or confirmed suitable, operating situations.

16. The method as claimed in claim 1, wherein:

operating situations that should be avoided or suitable, or confirmed suitable, operating situations are captured by simulations and then stored, wherein operating situations that should be avoided or suitable, or confirmed suitable, operating situations are also captured by measurements and then stored.

17. The method as claimed in claim 1, wherein:

critical operating situations are captured, wherein critical operating situations are those in which an oscillation of a component of the wind power installation, or at least one of the rotor blades, occurs with an amplitude which is above a predetermined amplitude threshold, but below an amplitude limit which is greater than the amplitude threshold, and an operating situation that should be avoided is inferred from a captured critical operating situation, in such a way that at least one installation setting is changed, and an operating situation that should be avoided is inferred from a resulting increase or decrease in the amplitude of the oscillation, without setting it.

18. A wind power installation having a rotor having a plurality of blades whose blade angle can be adjusted, wherein:

the wind power installation is prepared to carry out a method for setting the wind power installation, the wind power installation can take on variable operating situations, and each operating situation is characterized by a combination of settable installation settings of the wind power installation and environmental conditions that can be captured, so that an operating situation can be set for given environmental conditions by setting the installation settings, and the method includes:

storing operating situations to be avoided and suitable operating situations in a memory by:

for each of a plurality of combinations of environmental conditions and installation settings for operating situations that should be avoided, storing a combination of environmental conditions and installation settings as a combination to be avoided for an operating situation that should be avoided, and for each of a plurality of combinations of environmental conditions and installation settings for operating situations that are suitable, storing a combination of environmental conditions and installation settings as a suitable combination for a suitable operating situation; and avoiding operating situations that should be avoided by:

capturing environmental conditions, and depending on the captured environmental conditions and the stored combinations to be avoided and suitable combinations, selecting and setting installation settings of the wind power installation such that:

installation settings of stored combinations to be avoided are avoided, and installation settings are selected from stored suitable combinations, wherein the installation settings considered include an azimuth orientation of the wind power installation, wherein the avoiding operating situations that should be avoided includes adjusting the azimuth orientation of the wind power installation, wherein the wind power installation is in a parked situation, and wherein the parked situation is an idling or rotor-locked situation.

19. The wind power installation as claimed in claim 18, wherein the wind power installation has an installation controller and the installation controller is prepared to carry out the method.

* * * * *